(12) United States Patent
Huang

(10) Patent No.: US 9,304,261 B2
(45) Date of Patent: Apr. 5, 2016

(54) OPTICAL JUMPER

(71) Applicant: HON HAI PRECISION INDUSTRY CO., LTD., New Taipei (TW)

(72) Inventor: Hsin-Shun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/475,957

(22) Filed: Sep. 3, 2014

(65) Prior Publication Data

US 2016/0062052 A1      Mar. 3, 2016

(51) Int. Cl.
  *G02B 6/36* (2006.01)
  *G02B 6/38* (2006.01)

(52) U.S. Cl.
  CPC ............ *G02B 6/3839* (2013.01); *G02B 6/3861* (2013.01); *G02B 6/3882* (2013.01); *G02B 6/3838* (2013.01)

(58) Field of Classification Search
  CPC .. G02B 6/3838; G02B 6/3839; G02B 6/3861; G02B 6/3882

USPC ................................................. 385/78, 80, 83
See application file for complete search history.

(56) References Cited

U.S. PATENT DOCUMENTS 8,478,094 B2 * 7/2013 Hsu ...................... G02B 6/4214
                                                              385/47

* cited by examiner

*Primary Examiner* — Ryan Lepisto
(74) *Attorney, Agent, or Firm* — Novak Druce Connolly Bove + Quigg LLP

(57) ABSTRACT

An optical jumper includes a fiber housing and two clamping arms. The fiber housing includes a top surface and a front surface connected to the top surface. The fiber housing defines a groove in the top surface and receiving channels in the bottom of the groove. The fiber housing defines through holes passing through the front surface. Each of the through holes is aligned with and communicated with a respective one of the receiving channels. The fiber housing defines a recess in the top surface. The recess is close to the front surface with respect to the groove. The recess is communicated with the receiving channels through the through holes. The two clamping arms are extending from the fiber housing in the same direction.

12 Claims, 4 Drawing Sheets

OPTICAL JUMPER

FIELD

The subject matter herein generally relates to fiber optic communication technologies, and particularly to an optical jumper.

BACKGROUND

As telecommunications and data networks become more fiber intensive, larger and larger numbers of fiber optic jumpers are being placed in the central office. A typical optical jumper includes a fiber housing and two clamping arms perpendicularly extending from the housing. The fiber housing defines a plurality of receiving channels and a plurality of through holes. Each of the receiving channels is aligned with and communicated with a respective one of the through holes. Optical fibers are received in the receiving channels, and each of the optical fibers has a bare fiber passing through the respective through hole. Each clamping arm defines a slide recess. Two slide recesses of the two clamping arms face each other and cooperatively receive and clamp an integrated optoelectric (OE) lens. The fiber housing defines two positioning holes at two sides of the through holes. The OE lens includes two positioning poles. The positioning poles are received in the positioning holes to align the OE lens to the bare fibers of the optical fibers.

BRIEF DESCRIPTION OF THE DRAWINGS

Implementations of the present technology will now be described, by way of example only, with reference to the attached figures.

DETAILED DESCRIPTION

Figure 1:
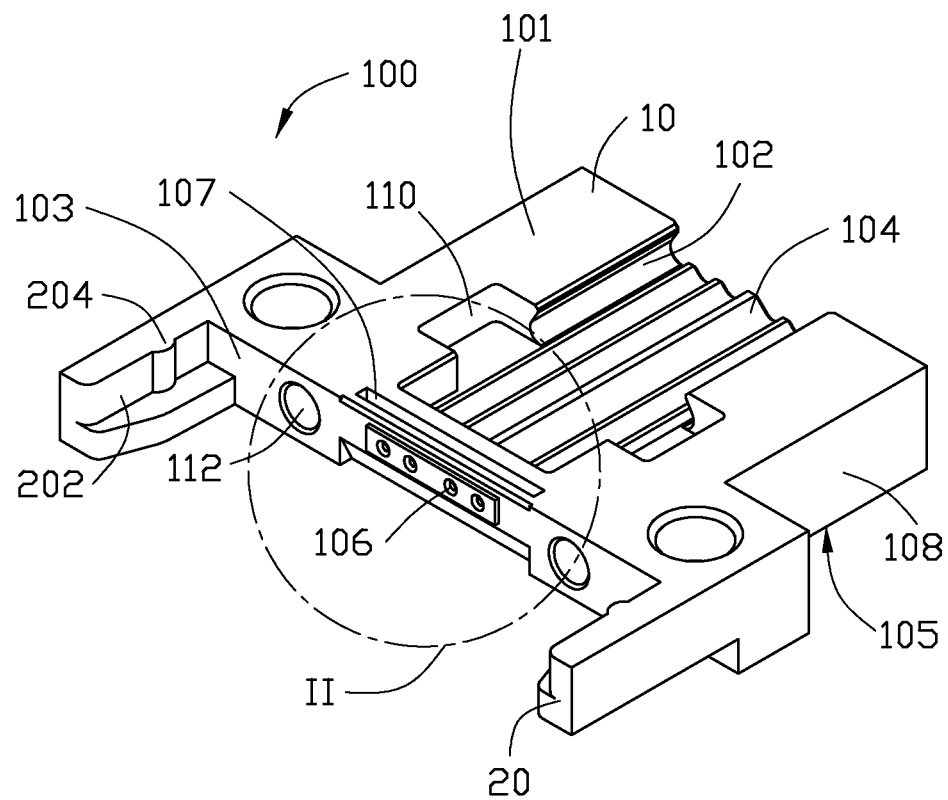
FIG. 1 is an isometric view of an embodiment of an optical jumper.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 2:
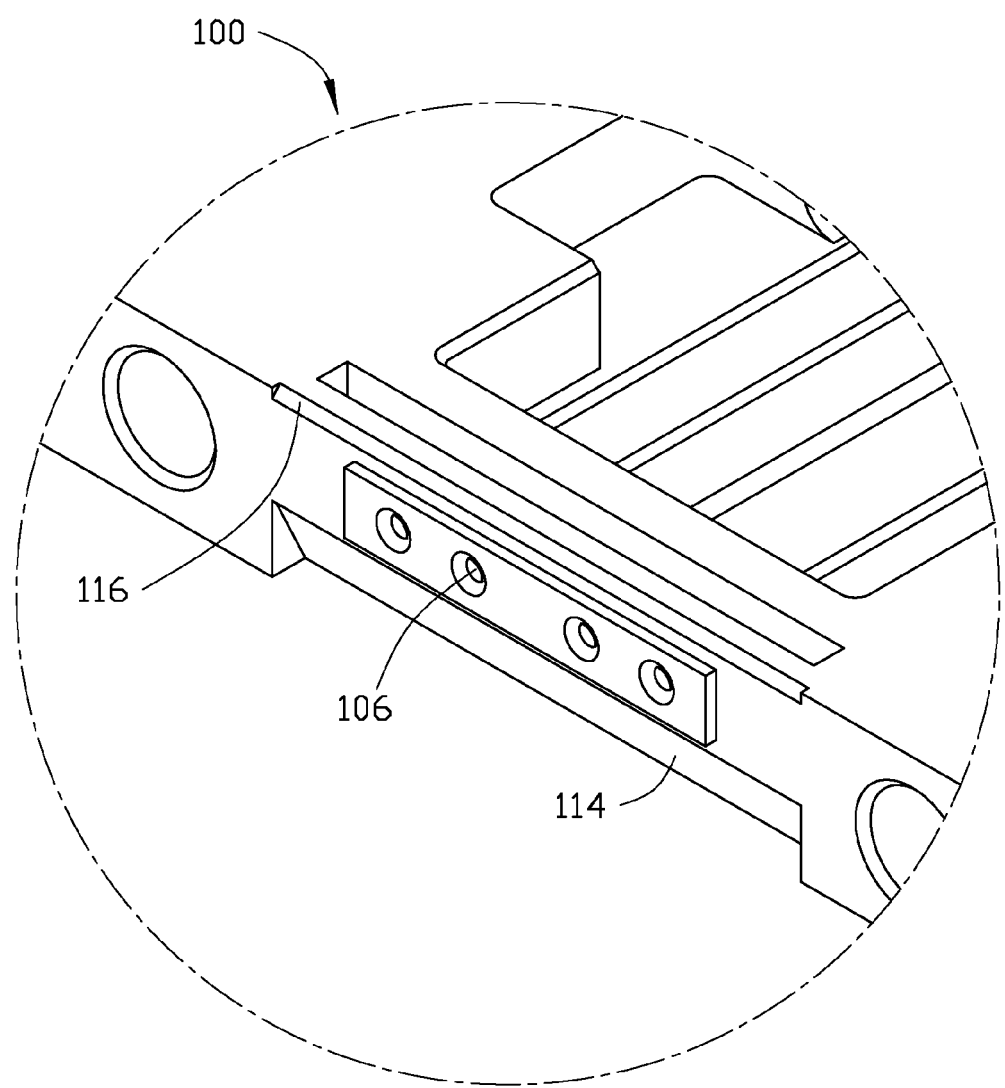
FIG. 2 is an enlarged view of a circled portion II of the optical jumper of FIG. 1.

Referring to FIGS. 1 and 2, an embodiment of an optical jumper 100 includes a fiber housing 10 and two clamping arms 20.

The fiber housing 10 includes a top surface 101, a front surface 103 perpendicularly connected to the top surface 101, and a bottom surface 105 parallel to the top surface 101. The fiber housing 10 defines a groove 102 in the top surface 101 and a plurality of receiving channels 104 in the bottom of the groove 102. Two first cutouts 110 are defined in two side surfaces of the groove 102. The fiber housing 10 also defines a recess 107 in the top surface 101. The recess 107 is close to the front surface 103 with respect to the groove 102. In the illustrated embodiment, the fiber housing 10 is substantially "T" shaped and defines two second cutouts 108 at two sides and opposite to each other. This reduces the material of manufacturing the optical jumper 100.

The front surface 103 defines a plurality of through holes 106, generally at the central portion thereof. Each of the through holes 106 is aligned with and communicated with a respective one of the receiving channels 104. The recess 107 is communicated with the receiving channels 104 through the through holes 106. The front surface 103 also defines two positioning holes 112 at two sides of the through holes 106. The fiber housing 10 includes a first beveled surface 114 at an intersection of the front surface 103 and the bottom surface 105. The fiber housing 10 also includes a second beveled surface 116 at an intersection of the front surface 103 and the top surface 101. The first beveled surface 114 and the second beveled surface 116 are positioned at other two sides of the through holes 106 and are opposite to each other.

Figure 3:
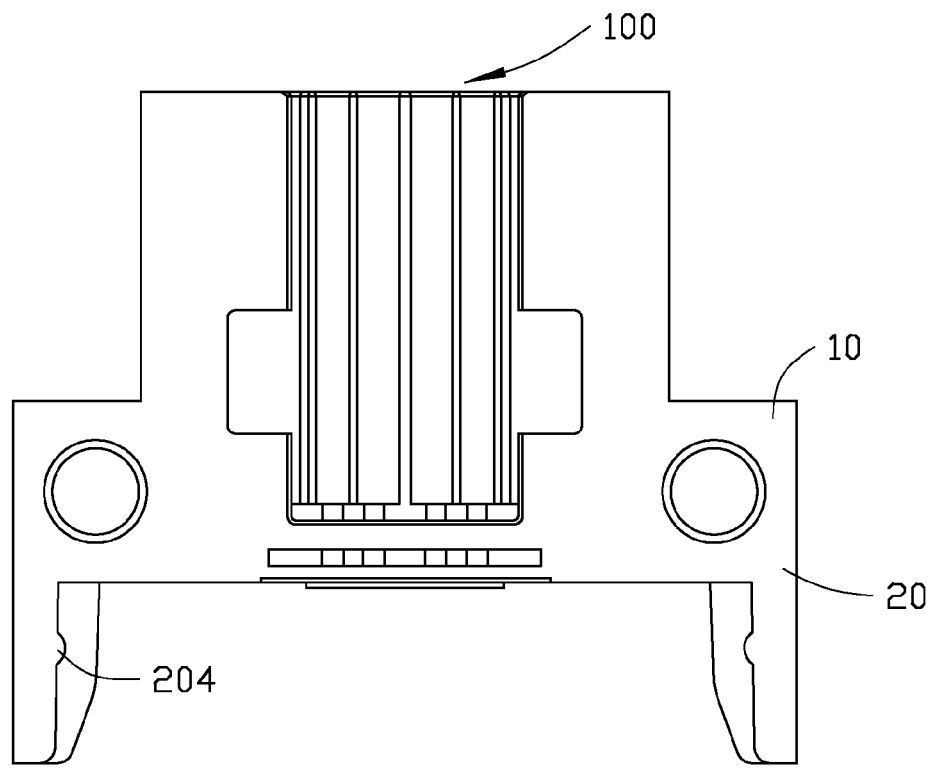
FIG. 3 is a top view of the optical jumper of FIG. 1.
Figure 4:
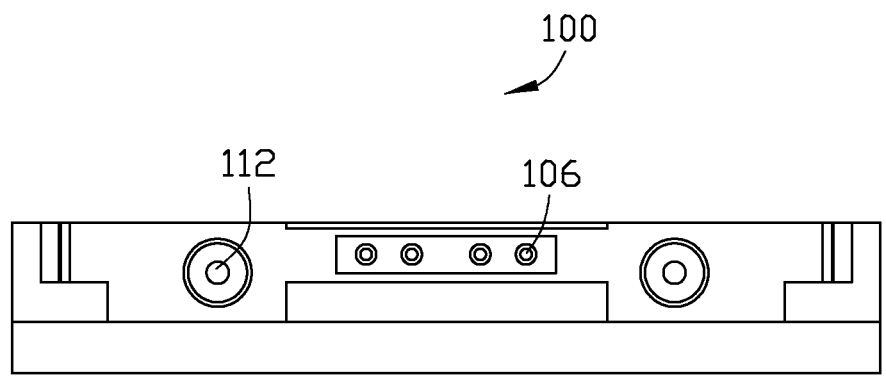
FIG. 4 is a front view of the optical jumper of FIG. 1.

Referring also to FIGS. 3 and 4, the two clamping arms 20 are perpendicularly extending from the fiber housing 10 in the same direction. The two clamping arms 20 are positioned at two sides of the positioning holes 112 and are opposite to each other. Each of the clamping arms 20 defines a slide recess 202 and includes a projection 204 on an inner surface of the slide recess 202. Two slide recesses 202 of the two clamping arms 20 face to each other. In the illustrated embodiment, the projection 204 is substantially semi-cylindrical shaped.

In assembly, optical fibers are received in the receiving channels 104 accordingly. Each of the optical fibers has a bare fiber. The bare fiber passes through a respective through hole 106. Glue is filled into the groove 102 from the first cutouts 110 and then solidified to fix the optical fibers in the receiving channels 104. The recess 107 is configured to avoid the glue from overflowing into the bare fiber and even into an end surface of the bare fiber. A laser is applied to cut a portion of the bare fiber coming out of the front surface 103. The first beveled surface 114 and the second beveled surface 116 can avoid the laser from burning the optical jumper 100 and can facilitate the laser easily cutting the portion of the bare fiber coming out of the front surface 103. An integrated optoelectric (OE) lens is slid into the slide recesses 202, and positioning poles of the OE lens are inserted into the positioning holes 112 to align the OE lens with the optical fibers. The two clamping arms 20 cooperatively hold the OE lens therebetween. The projections 204 help the clamping arms 20 firmly hold the OE lens.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An optical jumper, comprising:
a fiber housing comprising a top surface and a front surface connected to the top surface, the fiber housing defining a groove in the top surface and a plurality of receiving channels in the bottom of the groove, the fiber housing defining a plurality of through holes passing through the front surface, each of the through holes aligned with and communicated with a respective one of the receiving channels, the fiber housing defining a recess in the top surface, the recess being close to the front surface with respect to the groove, the recess communicated with the receiving channels through the through holes; and
two clamping arms extending from the fiber housing in the same direction;
wherein the fiber housing comprises a bottom surface connected to the front surface, a first beveled surface, and a second beveled surface, the first beveled surface is positioned at an intersection of the bottom surface and the front surface, the second beveled surface is positioned at an intersection of the top surface and the front surface, and the first beveled surface and the second beveled surface are positioned at two sides of the through holes and opposite to each other.

2. The optical jumper of claim 1, wherein the front surface is perpendicularly connected to the top surface, and the bottom surface is parallel to the top surface.

3. The optical jumper of claim 1, wherein the fiber housing defines two positioning holes at another two sides of the through holes and opposite to each other.

4. The optical jumper of claim 3, wherein the two clamping arms are positioned at two sides of the positioning holes and are opposite to each other.

5. The optical jumper of claim 4, wherein each of the clamping arms defines a slide recess, and two slide recesses of the two clamping arms face to each other.

6. The optical jumper of claim 5, wherein each of the clamping arms comprises a projection on an inner surface of the slide recess.

7. The optical jumper of claim 6, wherein the projection is substantially semi-cylindrical shaped.

8. The optical jumper of claim 1, wherein the fiber housing defines two first cutouts in two side surfaces of the groove.

9. The optical jumper of claim 8, wherein the fiber housing is substantially "T" shaped and defines two second cutouts at two sides of the fiber housing.

10. The optical jumper of claim 1, wherein the through holes are positioned at a central portion of the front surface.

11. The optical jumper of claim 1, wherein the two clamping arms are perpendicularly extending from the fiber housing.

12. An optical jumper housing comprising:
a main fiber housing portion having a top surface, a front surface connected to and angled away from the top surface, a rear surface substantially opposite the front surface and a bottom surface substantially opposite the top surface; and
two clamping arm portions extending away from the main fiber housing portion at opposing sides of the front surface;
wherein, a groove extending inward from the rear surface is defined in the top surface of the main fiber housing portion, the groove having a front groove face substantially opposite the front main housing portion face and having a plurality of receiving channels formed therein, with the receiving channels formed closest to the bottom surface;
wherein, there is a plurality of through holes formed in the main fiber housing portion extending from the front main housing portion face to the front groove face, each of the plurality of through holes aligning with and communicating with one of the plurality of receiving channels; and
wherein, a recess is formed in the top main housing portion surface extending from the top housing surface to the plurality of through holes, with the recess positioned substantially close to the front surface of the main housing portion.

* * * * *